United States Patent
Choo et al.

(10) Patent No.: US 10,220,525 B2
(45) Date of Patent: Mar. 5, 2019

(54) NON-FUNCTIONAL REQUIREMENT TESTING FOR ROBOTS

(71) Applicant: International Business Machines Corporation, Armonk, NY (US)

(72) Inventors: Kristina Y. Choo, Chicago, IL (US); Krishnan K. Ramachandran, Campbell, CA (US); Gandhi Sivakumar, Bentleigh (AU)

(73) Assignee: International Business Machines Corporation, Armonk, NY (US)

(*) Notice: Subject to any disclaimer, the term of this patent is extended or adjusted under 35 U.S.C. 154(b) by 23 days.

(21) Appl. No.: 15/446,358

(22) Filed: Mar. 1, 2017

(65) Prior Publication Data

US 2018/0250834 A1 Sep. 6, 2018

(51) Int. Cl.
*B25J 19/00* (2006.01)

(52) U.S. Cl.
CPC .................. *B25J 19/0095* (2013.01)

(58) Field of Classification Search
CPC .... B25J 19/0095; B25J 9/1605; B25J 9/0084; B25J 9/0081
USPC ........ 702/115; 700/245, 253, 254, 257, 259, 700/264, 248
See application file for complete search history.

(56) References Cited

U.S. PATENT DOCUMENTS

| | | | |
|---|---|---|---|
| 7,383,100 B2 * | 6/2008 | Ng-Thow-Hing | B62D 57/028 318/568.1 |
| 9,321,176 B1 | 4/2016 | Sun et al. | |
| 2014/0316570 A1 | 10/2014 | Sun et al. | |
| 2016/0257000 A1 * | 9/2016 | Guerin | B25J 9/1605 |

OTHER PUBLICATIONS

"Method and System for Protocol Oriented Behavior of Robot Interfaces in Cognitive Models", An IP.com Prior Art Database Technical Disclosure, IP.com No. IPCOM000247234D, IP.com Electronic Publication Date: Aug. 17, 2016, 4 pages, http://ip.com/IPCOM/000247234.

"Method and System for Multi-perception Cognitive Mapping", An IP.com Prior Art Database Technical Disclosure, IP.com No. IPCOM000236870D, IP.com Electronic Publication Date: May 20, 2014, 3 pages, http://ip.com/IPCOM/000236870.

(Continued)

*Primary Examiner* — John H Le
(74) *Attorney, Agent, or Firm* — Christopher K. McLane; Maeve M. Carpenter

(57) ABSTRACT

In an approach to non-functional requirement testing of a robot, a computer determines one or more kinematic actions included in a received command. The computer determines at least one component of the robot included in an operation of the one or more kinematic actions. The computer determines at least one agent associated with the at least one component of the robot included in the one or more kinematic actions. The computer sends the one or more kinematic actions to the robot. In response to the robot performing the one or more kinematic actions, the computer receives, from the at least one agent, at least one characteristic of the performed one or more kinematic actions associated with the at least one component of the robot included in the one or more kinematic actions. The computer, based on the received at least one characteristic, generates one or more test results.

20 Claims, 3 Drawing Sheets

(56) References Cited

OTHER PUBLICATIONS

"Robot Framework User Guide—Version 3.0", Copyright © 2008-2015 Nokia Solutions and Networks, Generated on: Dec. 31, 2015, 272 pages, http://robotframework.org/robotframework/latest/RobotFrameworkUserGuide.html#advanced-features.

Chaya et al., "SPOT—Smart Path-planning and Object-avoidance Technology", downloaded from Internet on Dec. 2, 2016, 17 pages, http://www.pages.drexel.edu/~sjc28/spot/req_doc/index.html#3.

Fenn et al., "Addressing the non-functional requirements of computer vision systems: A case study", Preprint submitted to Journal of Systems and Software—Nov. 3, 2014, 19 pages, https://arxiv.org/abs/1410.8623.

Gupta et al., "Mobile Robot, Delivery 1 Group 1", Mobile project, requirement document, downloaded from Internet on Dec. 2, 2016, 5 pages, http://www.idi.ntnu.no/emner/tdt4240/MobileRobot/AssReq/Requirement_1.pdf.

Di Nuovo et al., "Mental practice and verbal instructions execution: a cognitive robotics study", WCCI 2012 IEEE World Congress on Computational Intelligence, Jun. 10-15, 2012, pp. 2771-2776, http://www.poeticon.eu/publications/DiNuovoetalWCCI2012.pdf.

\* cited by examiner

NON-FUNCTIONAL REQUIREMENT TESTING FOR ROBOTS

BACKGROUND OF THE INVENTION

The present invention relates generally to the field of robotics, and more particularly to non-functional requirement testing for robots.

Non-functional testing is the testing of a software application or system for its non-functional requirements. A non-functional requirement is a requirement that specifies criteria that can be used to judge the operation of a system, rather than specific behaviors. They are contrasted with functional requirements that define specific behavior or functions. Broadly, functional requirements define what a system is supposed to do and non-functional requirements define how well it should be done, i.e., non-functional requirements are quantified and testable.

General-purpose autonomous robots can perform a variety of functions independently. General-purpose autonomous robots typically can navigate independently in known spaces, handle their own re-charging needs, interface with electronic doors and elevators and perform other basic tasks. Like computers, general-purpose robots can link with networks, software and accessories that increase their usefulness. They may recognize people or objects, talk, provide companionship, monitor environmental quality, respond to alarms, pick up supplies and perform other useful tasks. General-purpose robots may perform a variety of functions simultaneously or they may take on different roles at different times of day.

Currently, many industries are trending toward cognitive models enabled by big data platforms and machine learning models. Cognitive models, also referred to as cognitive entities, are designed to remember the past, interact with humans, continuously learn, and continuously refine responses for the future with increasing levels of prediction. An example of a cognitive model interface is a cognitive robot. Cognitive robotics is concerned with endowing a robot with intelligent behavior by providing it with a processing architecture that will allow it to learn and reason about how to behave in response to complex goals in a complex world.

SUMMARY

Embodiments of the present invention disclose a method, a computer program product, and a system for non-functional requirement testing of a robot. The method may include a one or more computer processors determining one or more kinematic actions included in a received command. The one or more computer processors determine at least one component of the robot included in an operation of the one or more kinematic actions. The one or more computer processors determine at least one agent associated with the at least one component of the robot included in the one or more kinematic actions. The one or more computer processors send the one or more kinematic actions to the robot. In response to the robot performing the one or more kinematic actions, the one or more computer processors receive, from the at least one agent, at least one characteristic of the performed one or more kinematic actions associated with the at least one component of the robot included in the one or more kinematic actions. The one or more computer processors, based, at least in part, on the received at least one characteristic, generate one or more test results.

DETAILED DESCRIPTION

A cognitive robot (CR) is expected to naturally interact with humans, learn concepts and behaviors, and become a part of a human community. A CR is built with software components integrated with kinematic gesture components, resulting in a robot that responds and moves by perceiving signals through sensors, audio interfaces, visual interfaces, etc. For a CR to be considered a cognitive companion, serving as a supplement for performing many human functions, the CR is expected to deliver at least the same level of accuracy, quality, and throughput as may be delivered by a human. Current non-functional requirements testing mechanisms for various types of robots, including CRs, lack a standards-based, configurable framework. Embodiments of the present invention recognize that non-functional requirements testing of robots can be accelerated and improved by providing a test framework that enables defining an extensible, standards-based interface for testing kinematic parameters of physical components of a robot. Embodiments of the present invention also provide improvements to technical computing by implementing cognitive learning within the non-functional test framework resulting in faster and more accurate testing with the ability to compare current results to past performance data. Implementation of embodiments of the invention may take a variety of forms, and exemplary implementation details are discussed subsequently with reference to the Figures.

Figure 1:
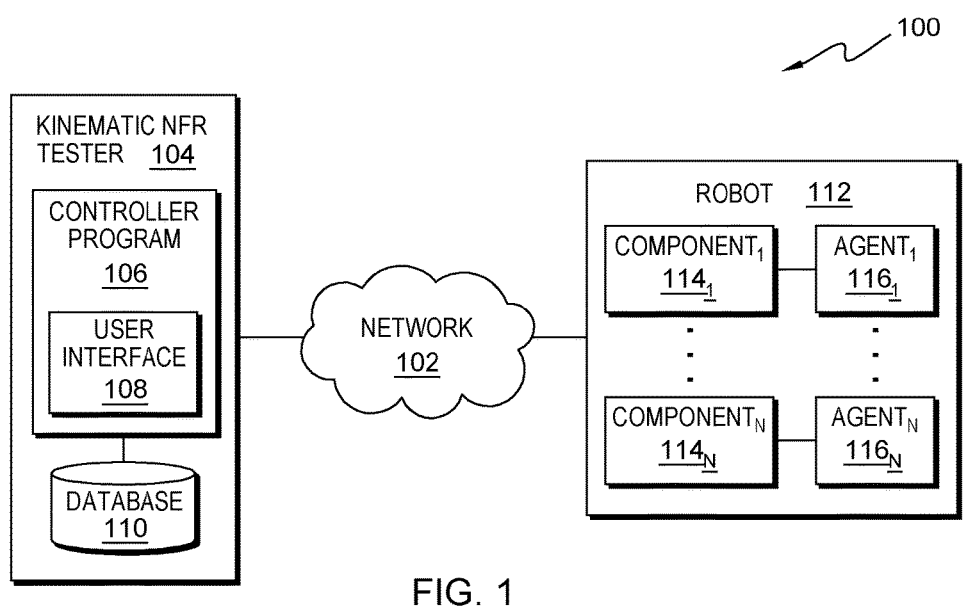
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes kinematic non-functional requirements (NFR) tester 104 and robot 112 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between kinematic NFR tester 104, robot 112, and other computing devices (not shown) within distributed data processing environment 100.

Kinematic NFR tester 104 can be a standalone computing device, a management server, a web server, a mobile computing device, or any other electronic device or computing system capable of receiving, sending, and processing data. In other embodiments, kinematic NFR tester 104 can represent a server computing system utilizing multiple computers as a server system, such as in a cloud computing environment. In another embodiment, kinematic NFR tester 104 can be a laptop computer, a tablet computer, a netbook computer, a personal computer (PC), a desktop computer, a personal digital assistant (PDA), a smart phone, or any other programmable electronic device capable of communicating with robot 112 and other computing devices (not shown) within distributed data processing environment 100 via network 102. In another embodiment, kinematic NFR tester 104 represents a computing system utilizing clustered computers and components (e.g., database server computers, application server computers, etc.) that act as a single pool of seamless resources when accessed within distributed data processing environment 100. Kinematic NFR tester 104 includes controller program 106 and database 110. Kinematic NFR tester 104 may include internal and external hardware components, as depicted and described in further detail with respect to FIG. 3.

Controller program 106 provides a configurable non-functional requirements testing framework for testing robot performance aspects, such as velocity of robotic component movements and quality or accuracy of parallel and sequential robotic movements. At runtime, controller program 106 identifies a list of agents associated with one or more physical robotic components, tests kinematic parameters by executing commands, via the agents, using the physical robotic components, compares results to required criteria, tolerances, and acceptable threshold values for each of the defined kinematic parameters, and provides a report to the user. In the depicted embodiment, controller program 106 resides on kinematic NFR tester 104. In another embodiment, controller program 106 may reside on robot 112. Controller program 106 includes user interface 108. Controller program 106 is depicted and described in further detail with respect to FIG. 2.

User interface 108 provides an interface to controller program 106 on kinematic NFR tester 104 for a user to define and perform non-functional requirements testing on robot 112. In one embodiment, user interface 108 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 108 may also be mobile application software that provides an interface to controller program 106 on kinematic NFR tester 104. Mobile application software, or an "app," is a computer program designed to run on smart phones, tablet computers and other mobile devices. User interface 108 may include the ability to accept a user's commands for robot 112 via audio input (received and configured using natural language processing), visual input, and other non-text methods of receiving a command known in the art. User interface 108 enables the user to define standards-based kinematic parameters for physical components of robot 112. For example, kinematic parameters can include, but are not limited to, action types such as sequential, parallel, singular, complex, and varying speeds, i.e., low, medium, and high. User interface 108 may also enable the user to define criteria, tolerances, and acceptable threshold values for each of the defined kinematic parameters to be tested during non-functional requirements testing. For example, a user can define a tolerance for angular velocity for a particular component as 0.02 m/s for a fast speed while, for medium speed, angular velocity can vary by 0.01 m/s. In another example, a user can define an acceptable slack time between parallel actions. In a further example, a user can define an acceptable lag time between sequential actions.

Database 110 is a repository for data used by controller program 106. In the depicted embodiment, database 110 resides on kinematic NFR tester 104. In another embodiment, database 110 may reside elsewhere within distributed data processing environment 100 provided controller program 106 has access to database 110. A database is an organized collection of data. Database 110 can be implemented with any type of storage device capable of storing data and configuration files that can be accessed and utilized by controller program 106, such as a database server, a hard disk drive, or a flash memory. Database 110 stores kinematic parameters for physical components associated with non-functional testing requirements of kinematic movements performed by robot 112. In one embodiment, database 110 stores kinematic parameters in a reference table. Database 110 may also store criteria, tolerances, and acceptable threshold values for each of the defined kinematic parameters to be tested during non-functional requirements testing.

Robot 112 is a machine capable of automatically carrying out a complex series of actions. In one embodiment, robot 112 carries out action in response to computing instructions, also known as commands. In one embodiment, robot 112 is a general purpose autonomous robot. In various embodiments, robot 112 is a cognitive robot, i.e., robot 112 includes a machine learning component (not shown) which enables robot 112 to "remember" task outcomes and use that data to influence future task performance. In one embodiment, robot 112 is guided by an external control device. In another embodiment, robot 112 may be guided by an internal control device. In one embodiment, robot 112 may be constructed to take on human form. Robot 112 includes component(s) 114 and agent(s) 116. Robot 112 may also include a plurality of sensors, cameras, microphones, speakers, etc. that can receive and react to commands.

Component(s) 114 are one or more of a plurality of physical, kinematic components which perform tasks, or a portion of a task, through movement. Component(s) 114 may be, for example, motors which control the motion of "joints," or nodes, such as shoulders, elbows, wrists, or fingers.

Agent(s) 116 are one or more of a plurality of network-management software modules that reside on managed devices, such as robot 112. A software agent is a computer program that acts on behalf of a user or other program. Agent(s) 116 collect data from component(s) 114 and report the data back to controller program 106. Agent(s) 116 are specifically associated with one or more component(s) 114. For example, agent $116_1$ is associated with component $114_1$, and agent $116_N$ is associated with component $114_N$, where N represents a positive integer, and accordingly the number of scenarios implemented in a given embodiment of the present invention is not limited to those depicted in FIG. 1. In another example, agent $116_1$ may be associated with component $114_1$, component $114_2$, and component 1143. In one embodiment, a group of agents may be referred to as a collection.

Figure 2:
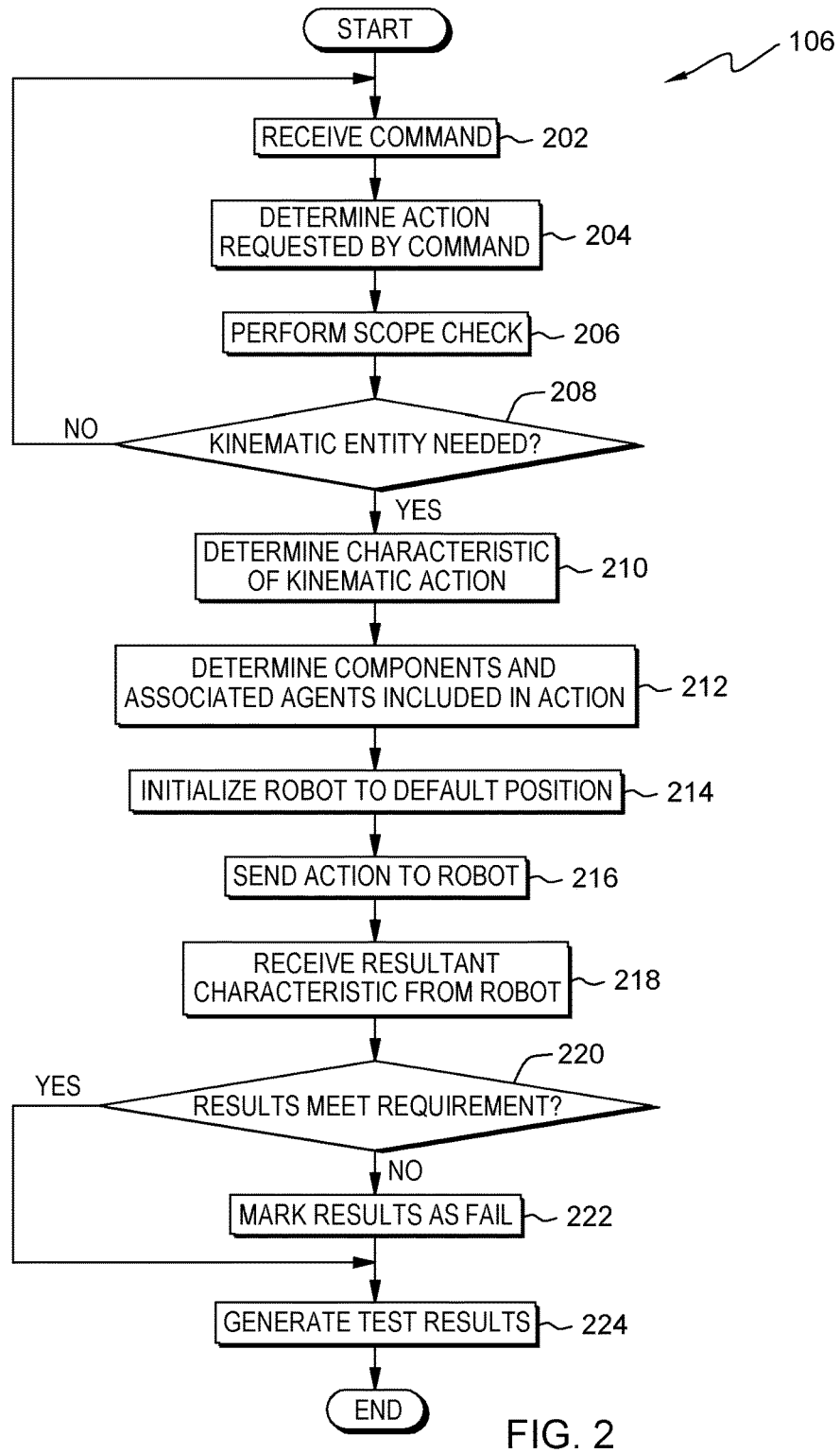
FIG. 2 is a flowchart depicting operational steps of a controller program, on a kinematic non-functional requirements tester within the distributed data processing environment of FIG. 1, for testing non-functional requirements of a robot, in accordance with an embodiment of the present invention.

FIG. 2 is a flowchart depicting operational steps of controller program 106, on kinematic non-functional requirements (NFR) tester 104 within distributed data processing environment 100 of FIG. 1, for testing non-functional requirements of a robot, in accordance with an embodiment of the present invention.

Controller program 106 receives a command (step 202). The user of kinematic NFR tester 104 provides a command to controller program 106 via user interface 108. In one embodiment, the user speaks a verbose command and controller program 106 receives the command via natural language processing techniques known in the art. For example, the user may speak a command such as "Wave to the audience" or "Raise both arms." In another embodiment, controller program 106 may receive the command via a text entry into user interface 108. In a further embodiment, controller program 106 may receive a command when the user displays a sign to robot 112, and vision systems in robot 112 (not shown) convert the words or symbols on the sign via techniques known in the art and transmit the command to controller program 106 via network 102.

Controller program 106 determines an action requested by the command (step 204). Controller program 106 interprets the verbose command, via natural language processing, and determines the action requested in the command. For example, if the command is "Wave to the audience" then controller program 106 determines the action is to raise the right arm and subsequently move the right hand. If the command is, for example, "Raise both arms" then controller program 106 determines the action is to raise the right arm and the left arm simultaneously. In an embodiment, controller program 106 may interpret context from the verbose command. For example, if the command is "Can you tell me how to get to the elevator? I'm in a hurry," then controller program 106 interprets the command as the user requesting the fastest path to the destination. Additionally, controller program 106 may determine the command includes more than one action, and can determine the order in which the actions are to be performed.

Controller program 106 performs a scope check (step 206). Controller program 106 determines what type of actions are involved in responding to the command. By analyzing the requested action, controller program 106 can evaluate what type of physical components are necessary for robot 112 to perform the requested action. For example, controller program 106 can determine whether vision systems, aural systems, or kinematic entities are needed for robot 112 to perform the action.

Based on the scope check, controller program 106 determines whether a kinematic entity is needed (decision block 208). Once controller program 106 determines which of component(s) 114 are involved in responding to the command, controller program 106 determines whether one or more of the involved components are kinematic entities. For example, if the command is "Wave to the audience," then controller program 106 may determine that waving is a kinematic response, i.e., the response includes movement, and therefore all physical components associated with movement of the right arm of robot 112 are involved. In another example, if the command is "Tell us your name," then controller program 106 may determine that speaking is not a kinematic response, and therefore no kinematic entity is needed. If controller program 106 determines no kinematic entity is needed ("no" branch, decision block 208), then controller program 106 returns to step 202 to receive the next command.

If controller program 106 determines a kinematic entity is needed ("yes" branch, decision block 208), then controller program 106 determines a characteristic of a kinematic action (step 210). Controller program 106 analyzes the kinematic actions involved in responding to the command and determines types of actions and characteristics associated with the actions. As used herein, a characteristic associated with a kinematic action refers to a description of an attribute or requirement of the action. For example, if the command is "Wave to the audience," then controller program 106 determines that a wave is a singular action, i.e., a wave is performed by one arm of robot 112. Controller program 106 may also determine that a wave is a sequential action, i.e., first the arm raises, then the hand moves. Controller program 106 may also determine the speed of the action, i.e., robot 112 performs a wave at a medium speed. In another example, if the command is "Raise both arms," then controller program 106 determines the action is singular and at medium speed, as well as a parallel action, since two arms move simultaneously.

Controller program 106 determines one or more components and associated agents included in the operation of the kinematic action (step 212). Controller program 106 determines which components robot 112 uses to perform the kinematic action. Controller program 106 lists physical components, such as component(s) 114 and associated agents, such as agent(s) 116 that robot 112 uses to perform the kinematic action in response to the command. In one embodiment, controller program 106 determines whether robot 112 includes one or more of the components needed to perform the kinematic action. Continuing the waving example, controller program 106 determines component $114_1$ is a motor in the right shoulder of robot 112 and agent $116_1$ is software associated with tracking the movement of component $114_1$ Controller program 106 may determine that three motors are involved in the kinematic action, such as a motor associated with a shoulder, a motor associated with an elbow, and a motor associated with a wrist. Controller program 106 determines the agents associated with each of the three motors. In an embodiment where controller program 106 incorporates cognitive capabilities, controller program 106 continuously learns which agents are associated with various commands which include kinematic actions such that subsequent receipt of commands are adapted faster, resulting in improving the overall accuracy and speed of the testing capability. By anticipating the agents' responses, controller program 106 can retrieve corresponding data from previous tests for quick comparisons to past performance.

Controller program 106 initializes the robot to a default position (step 214). In an embodiment, kinematic actions in response to a command begin from a default position of robot 112. In one embodiment, the user of kinematic NFR tester 104 defines the default position, via user interface 108. In another embodiment, a system designer of robot 112 may define the default position.

Controller program 106 sends the action to the robot (step 216). Controller program 106 sends the kinematic action to robot 112, via agent(s) 116, as a collection of discreet movements and associated characteristics, referenced from the default position. In one embodiment, each discreet movement associated with a command is defined and stored in database 110. A movement associated with a physical component may include a velocity of the movement, an angle of the movement, a final position of the movement, etc. The action may also include an order of sequential movements. Continuing the wave example, controller program 106 may send the sequential action as: motor 1—raise shoulder 10 degrees at 0.05 m/s; motor 2—bend elbow 45 degrees at 0.05 m/s; motor 3—raise hand 30 degrees at 0.1 m/s, lower hand 30 degrees at 0.1 m/s, repeat previous two actions.

Controller program 106 receives one or more resultant characteristics from the robot (step 218). Each physical component performing an action, such as component(s) 114, is associated with one or more agents, such as agent(s) 116, which monitor the action and record various characteristics of the action. In one embodiment, controller program 106 exposes agent(s) 116 via a standards-based interface. Examples of standards-based interfaces include, but are not limited to, Simple Network Management Protocol (SNMP), Common Object Request Broker Architecture (CORBA®), or any other non-standard protocols. The agent associated with the physical component may record information such as the component identification or manufacturer. The agent may also record a time stamp associated with the start of the kinematic action and the end of the kinematic action. The agent may also record characteristics of the kinematic action. For example, agent $116_1$ may record an initial and final angle, an angular velocity, and an initial and final position of component $114_1$. In another example, if the kinematic action is a sequential or parallel action of more than one component, then agent $116_1$ may also record an initial and final angle of component $114_1$ relative to another component, an angular velocity of component $114_1$ relative to another component, and an initial and final position of component $114_1$ relative to another component. Upon completion of the movement, controller program 106 receives resultant characteristics from agent(s) 116, via network 102.

Controller program 106 determines whether the results meet a requirement (decision block 220). Controller program 106 compares the results tracked by agent(s) 116 to the criteria, tolerances, and acceptable threshold values defined by the user for each characteristic and stored in database 110, to determine whether the response of robot 112 to the command meets the non-functional test requirements. For example, controller program 106 may compare the recorded angular velocity, final angle, and final position of component $114_1$ to the predefined values for those characteristics in response to a particular command, such as "Wave to the audience." In another example, controller program 106 may compare a variation in slack time between two simultaneous, parallel actions, such as raising both arms, or in lag time between two sequential actions, such as raising an arm followed by moving the hand. In one embodiment, controller program 106 may compute one or more tolerances by integrating with one or more external interfaces to account for attributes such as temperature, pressure, gravitational force, etc.

If controller program 106 determines that the results do not meet a requirement ("no" branch, decision block 220), then controller program 106 marks the results as a fail (step 222). Controller program 106 flags any results of the non-functional testing that do not meet the pre-defined criteria, tolerances or acceptable threshold values stored in database 110. In an embodiment where controller program 106 does not find an associated criteria, tolerance, or acceptable threshold value in database 110 for a kinematic parameter received from agent(s) 116, controller program 106 may flag the result as missing a requirement or as an unidentified reference. In an embodiment where controller program 106 flags a missing requirement, controller program 106 may notify the user, via user interface 108, that a requirement is missing.

If controller program 106 determines that the results meet a requirement ("yes" branch, decision block 220), or responsive to marking the results as a fail, controller program 106 generates test results (step 224). Controller program 106 compiles the results of the non-functional requirements test of the received command and generates a report. In one embodiment, controller program 106 stores the report in database 110 for the user to access via user interface 108. In another embodiment, controller program 106 may display the report directly to the user via user interface 108. In a further embodiment, controller program 106 may transmit the results as an email or text message to the user.

Figure 3:
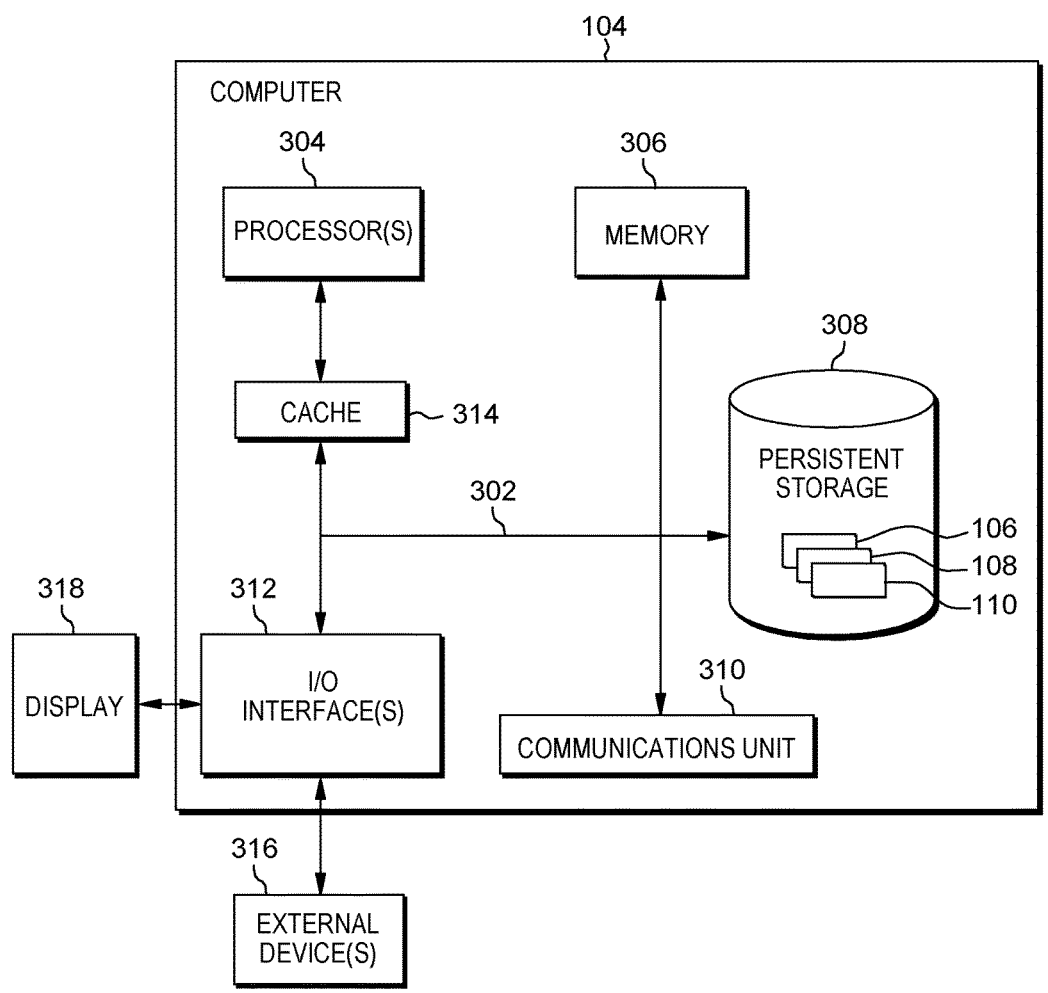
FIG. 3 depicts a block diagram of components of the kinematic non-functional requirements tester executing the controller program within the distributed data processing environment of FIG. 1, in accordance with an embodiment of the present invention.

FIG. 3 depicts a block diagram of components of kinematic non-functional requirements (NFR) tester 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Kinematic NFR tester 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., controller program 106, user interface 108, and database 110, are stored in persistent storage 308 for execution and/or access by one or more of the respective processor(s) 304 of kinematic NFR tester 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of robot 112. In these examples, communications unit 310 includes one or more network interface cards. Communications unit 310 may provide communications through the use of either or both physical and wireless communications links. Controller program 106, user interface 108, database 110, and other programs and data used for implementation of the present invention, may be downloaded to persistent storage 308 of kinematic NFR tester 104 through communications unit 310.

I/O interface(s) 312 allows for input and output of data with other devices that may be connected to kinematic NFR tester 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., controller program 106, user interface 108, and database 110 on kinematic NFR tester 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for non-functional requirement testing of a robot, the method comprising:
    determining, by one or more computer processors, one or more kinematic actions included in a received command;
    determining, by the one or more computer processors, at least one component of a robot included in an operation of the one or more kinematic actions;
    determining, by the one or more computer processors, at least one agent associated with the at least one component of the robot included in the one or more kinematic actions;
    sending, by the one or more computer processors, the one or more kinematic actions to the robot;
    responsive to the robot performing the one or more kinematic actions, receiving, by the one or more computer processors, from the at least one agent, at least one characteristic of the performed one or more kinematic actions associated with the at least one component of the robot included in the one or more kinematic actions; and
    based, at least in part, on the received at least one characteristic, generating, by the one or more computer processors, one or more test results.

2. The method of claim 1, wherein the received command is a verbose command, and wherein determining the one or more kinematic actions included in the received command includes utilizing natural language processing.

3. The method of claim 1, further comprising:
    responsive to determining one or more kinematic actions included in the received command, performing, by the one or more computer processors, a scope check; and
    determining, by the one or more computer processors, whether a kinematic entity is included in the one or more kinematic actions included in the received command.

4. The method of claim 1, further comprising, prior to sending the one or more kinematic actions to the robot, initializing, by the one or more computer processors, the robot to a default position.

5. The method of claim 1, further comprising:
    responsive to receiving the at least one characteristic of the performed one or more kinematic actions associated with the at least one component of the robot included in the operation of the one or more kinematic actions, determining, by the one or more computer processors, whether the received at least one characteristic meets a requirement; and
    responsive to determining the received at least one characteristic does not meet a requirement, marking, by the one or more computer processors, the at least one characteristic as a fail.

6. The method of claim 5, wherein determining whether the received at least one characteristic meets a requirement further comprises, comparing, by the one or more computer processors, the received at least one characteristic to at least one of a criteria, a tolerance, and an acceptable threshold value.

7. The method of claim 1, further comprising, responsive to determining one or more kinematic actions included in the received command, determining, by the one or more computer processors, one or more characteristics associated with the one or more kinematic actions.

8. The method of claim 1, wherein the at least one characteristic of the performed one or more kinematic actions associated with the at least one component of the robot included in the operation of the one or more kinematic actions is selected from the group consisting of: a speed, a speed relative to at least one other component, a velocity, a velocity relative to at least one other component, an angle, an angle relative to at least one other component, an angular velocity, an angular velocity relative to at least one other component, a position, and a position relative to at least one other component.

9. The method of claim 1, wherein the one or more kinematic actions included in the received command are selected from the group consisting of: sequential, parallel, singular, and complex.

10. The method of claim 1, wherein non-functional requirement testing further comprises incorporating, by the one or more computer processors, one or more cognitive capabilities.

11. A computer program product for non-functional requirement testing of a robot, the computer program product comprising:
    one or more computer readable storage devices and program instructions stored on the one or more computer readable storage devices, the stored program instructions comprising:
    program instructions to determine one or more kinematic actions included in a received command;

program instructions to determine at least one component of a robot included in an operation of the one or more kinematic actions;
program instructions to determine at least one agent associated with the at least one component of the robot included in the one or more kinematic actions;
program instructions to send the one or more kinematic actions to the robot;
responsive to the robot performing the one or more kinematic actions, program instructions to receive, from the at least one agent, at least one characteristic of the performed one or more kinematic actions associated with the at least one component of the robot included in the one or more kinematic actions; and
based, at least in part, on the received at least one characteristic, program instructions to generate one or more test results.

12. The computer program product of claim 11, wherein the received command is a verbose command, and wherein determining the one or more kinematic actions included in the received command includes utilizing natural language processing.

13. The computer program product of claim 11, the stored program instructions further comprising:
responsive to determining one or more kinematic actions included in the received command, program instructions to perform a scope check; and
program instructions to determine whether a kinematic entity is included in the one or more kinematic actions included in the received command.

14. The computer program product of claim 11, the stored program instructions further comprising:
responsive to receiving the at least one characteristic of the performed one or more kinematic actions associated with the at least one component of the robot included in the operation of the one or more kinematic actions, program instructions to determine whether the received at least one characteristic meets a requirement; and
responsive to determining the received at least one characteristic does not meet a requirement, program instructions to mark the at least one characteristic as a fail.

15. The computer program product of claim 11, the stored program instructions further comprising, responsive to determining one or more kinematic actions included in the received command, program instructions to determine one or more characteristics associated with the one or more kinematic actions.

16. A computer system for non-functional requirement testing of a robot, the computer system comprising:
one or more computer processors;
one or more computer readable storage devices;
program instructions stored on the one or more computer readable storage devices for execution by at least one of the one or more computer processors, the stored program instructions comprising:
program instructions to determine one or more kinematic actions included in a received command;
program instructions to determine at least one component of the robot included in an operation of the one or more kinematic actions;
program instructions to determine at least one agent associated with the at least one component of the robot included in the one or more kinematic actions;
program instructions to send the one or more kinematic actions to the robot;
responsive to the robot performing the one or more kinematic actions, program instructions to receive, from the at least one agent, at least one characteristic of the performed one or more kinematic actions associated with the at least one component of the robot included in the one or more kinematic actions; and
based, at least in part, on the received at least one characteristic, program instructions to generate one or more test results.

17. The computer system of claim 16, wherein the received command is a verbose command, and wherein determining the one or more kinematic actions included in the received command includes utilizing natural language processing.

18. The computer system of claim 16, the stored program instructions further comprising:
responsive to determining one or more kinematic actions included in the received command, program instructions to perform a scope check; and
program instructions to determine whether a kinematic entity is included in the one or more kinematic actions included in the received command.

19. The computer system of claim 16, the stored program instructions further comprising:
responsive to receiving the at least one characteristic of the performed one or more kinematic actions associated with the at least one component of the robot included in the operation of the one or more kinematic actions, program instructions to determine whether the received at least one characteristic meets a requirement; and
responsive to determining the received at least one characteristic does not meet a requirement, program instructions to mark the at least one characteristic as a fail.

20. The computer system of claim 16, the stored program instructions further comprising, responsive to determining one or more kinematic actions included in the received command, program instructions to determine one or more characteristics associated with the one or more kinematic actions.

* * * * *